United States Patent

[11] 3,547,215

[72] Inventor James L. Bird
 Muskegon, Mich.
[21] Appl. No. 735,275
[22] Filed June 7, 1968
[45] Patented Dec. 15, 1970
[73] Assignee Neway Equipment Company
 Muskegon, Mich.
 a corporation of Michigan

[54] AUTOMOTIVE VEHICLE SUSPENSION STRUCTURE
 9 Claims, 9 Drawing Figs.
[52] U.S. Cl. .................................................. 180/71,
 280/124
[51] Int. Cl. .................................................... B60g 9/02
[50] Field of Search .......................................... 280/124,
 124F, 104.5; 180/71, 731Z, 22

[56] References Cited
 UNITED STATES PATENTS
2,913,252 11/1959 Norrie........................... 280/104.5
3,332,701 7/1967 Masser.......................... 280/124
3,406,983 10/1968 Masser.......................... 280/124

Primary Examiner—A. Harry Levy
Attorney—Barnes, Kisselle, Raisch & Choate

ABSTRACT: Ground-engaging wheels are suspended from a vehicle frame by an axle having connections with a pair of vertically swingable control arms adjacent the sides of the frame. Each connection comprises a pair of longitudinally spaced, laterally extending pins and rubber bushings which facilitate a limited amount of articulation at the connections. The connections and control arms are disposed outwardly of the sides of the frame. A beam interconnects the control arms and is provided with one or more rubber bushed joints which facilitate a limited amount of relative movement of the control arms. Air springs transmit load between the beam and vehicle frame. The beam transmits the spring load from a location beneath the frame outwardly to the control arms.

INVENTOR.
JAMES L. BIRD

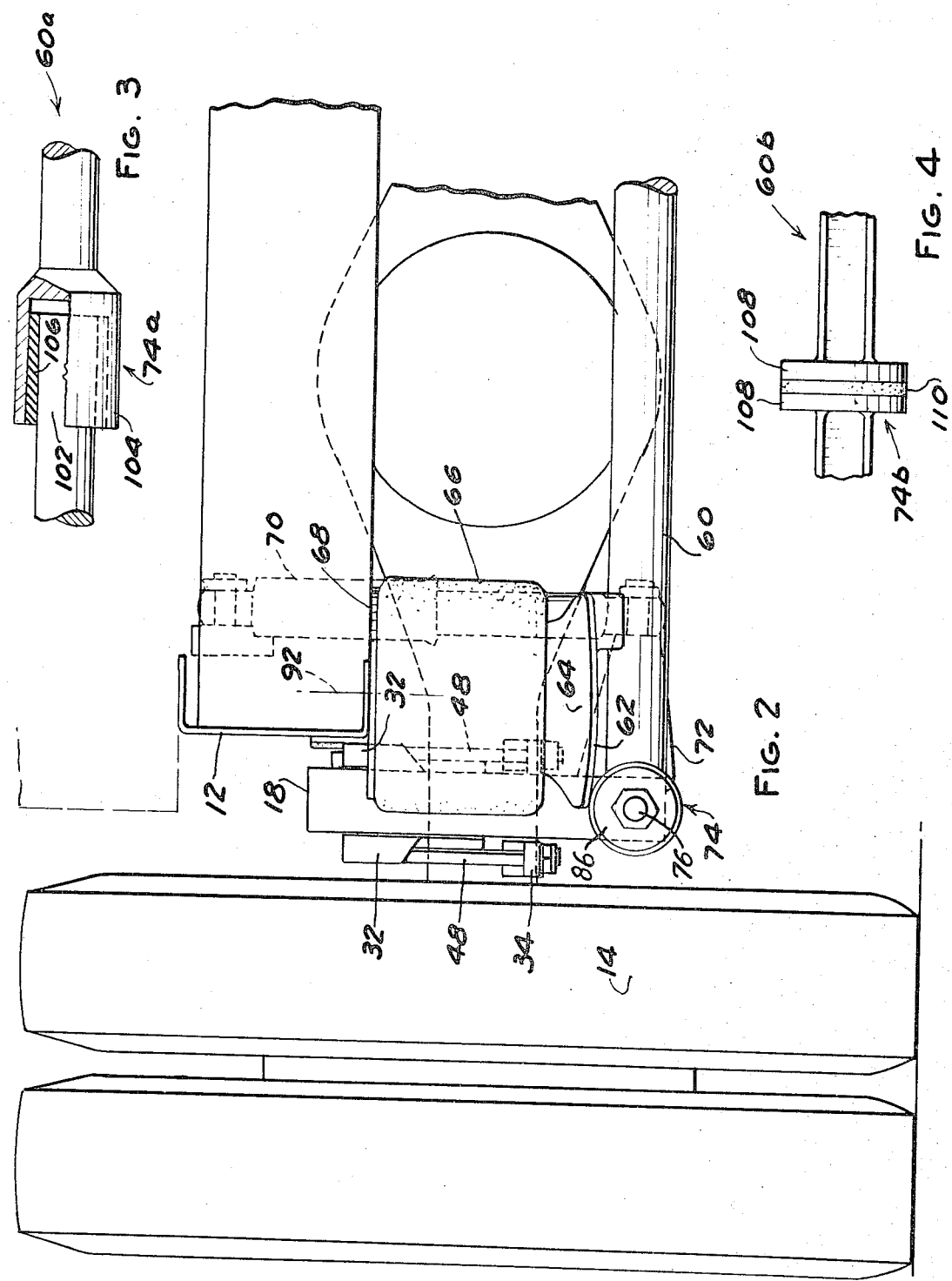

PATENTED DEC 15 1970

INVENTOR.
JAMES L. BIRD
BY
Barnes, Kisselle, Raisch & Choate
ATTORNEYS

AUTOMOTIVE VEHICLE SUSPENSION STRUCTURE

The suspension of this invention is especially adapted for use with air springs in commercial vehicles and can be employed in single-axle units or in tandem arrangements of two or more axles. The axles can be either driven or nondriven.

An air spring is essentially an air inflated bag and of itself has insignificant lateral stability; therefore, in air spring suspensions it is necessary to provide mechanical means for controlling all lateral forces and force components on the suspension and its various members. In some previous suspensions this has been accomplished by the use of relatively complicated systems of torque rods, lateral stabilizer bars, bolsters and the like, especially in tandem arrangements.

A greatly simplified suspension is shown in U.S. Pat. No. 3,332,701 in which the air springs are disposed between two vertically swinging control arms to which the axle is also attached. A feature of that suspension is that each axle-control arm attachment comprises a pair of longitudinally spaced, laterally extending elastomer bushed pins. This enables the attachments to articulate within predetermined limitations to facilitate both lateral displacement of the control arms and differential vertical swinging movements thereof as the vehicle rounds a curve or traverses uneven ground. The flexibility or rigidity of such a suspension to lateral forces or unlike vertical forces on the control arms can be tailored to meet the requirements of a particular vehicle by varying such factors as the length and spacing between the attachment pins and the configuration and dimensions of the elastomer bushings.

Such suspensions have been highly successful on commercial vehicles, especially where the control arms can be mounted for swinging beneath the vehicle frame. However, in some vehicles it is desirable to mount the control arms as far outwardly as possible from the longitudinal center line of the vehicle. One reason is to achieve maximum stability. Another reason, particularly where the axle is a driven axle, is to be able to attach the control arm to that portion of the axle housing which is immediately adjacent the wheel where the axle housing usually has a standard rectangular or circular cylindrical configuration rather than being tapered or irregular in shape. By connecting with the axle at that location the connecting hardware can be greatly simplified and for the most part standardized.

A problem arises however from the fact that in most vehicles there is only a very limited amount of horizontal space between the outer sides of the vehicle frame and the wheel. A control arm mounted for vertical movement within this space consequently must be relatively narrow and would not of itself have the rigidity necessary for use in suspensions of the type discussed above.

The object of the present invention is to provide a relatively simple inexpensive suspension structure, of the type discussed above, improved so that the control arms and their axle attachments can be disposed outwardly of the sides of the vehicle frame while at the same time retaining the versatility and economy of the above-discussed suspension and providing adequate control for all forces in the air spring suspension other than the vertical forces controlled by the spring themselves.

In general, the invention contemplates the use of a beam which extends laterally beneath the vehicle frame and is connected to the control arms. The air springs are interposed between the frame and beam at such a location that the centerlines of the springs are beneath the frame. The beam transmits the spring load outwardly to the control arms. The beam provides a torsion member which resists differential vertical swinging movements of the control arm and also braces the control arms against horizontal movements thereof relative to the vehicle frame. One or more joints are provided in the beam or its connections to the control arms and these joints articulate to a limited degree upon any such movements of the control arms. The joints incorporate bodies of elastomer material which distort resiliently when the joints articulate. This material is dimensioned, configured and distributed so as to provide a generally predetermined resistance to each of the movements of the control arms. One form of the invention is illustrated in the accompanying drawings.

FIG. 2 is a fragmentary end view looking in the direction of arrow 2 of FIG. 1.

FIG. 3 is a fragmentary partly-diagrammatic view partly in elevation and partly in section illustrating a modified form of beam structure.

FIG. 4 is a fragmentary partly-diagrammatic view illustrating another modified form of beam structure.

Figure 1:
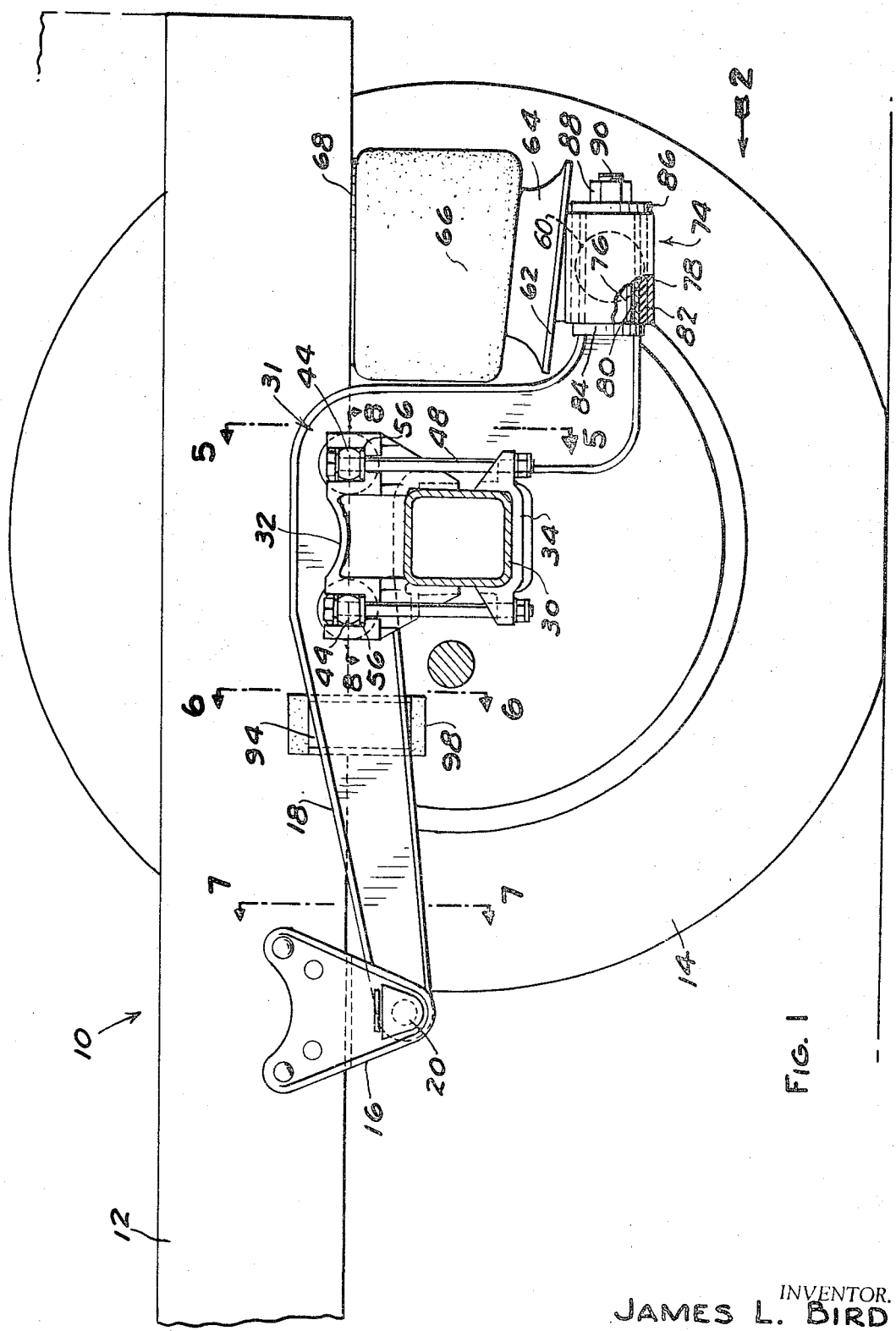
FIG. 1 is a view partly in side elevation and partly in vertical section illustrating a suspension which incorporates the present invention.
Figure 5:
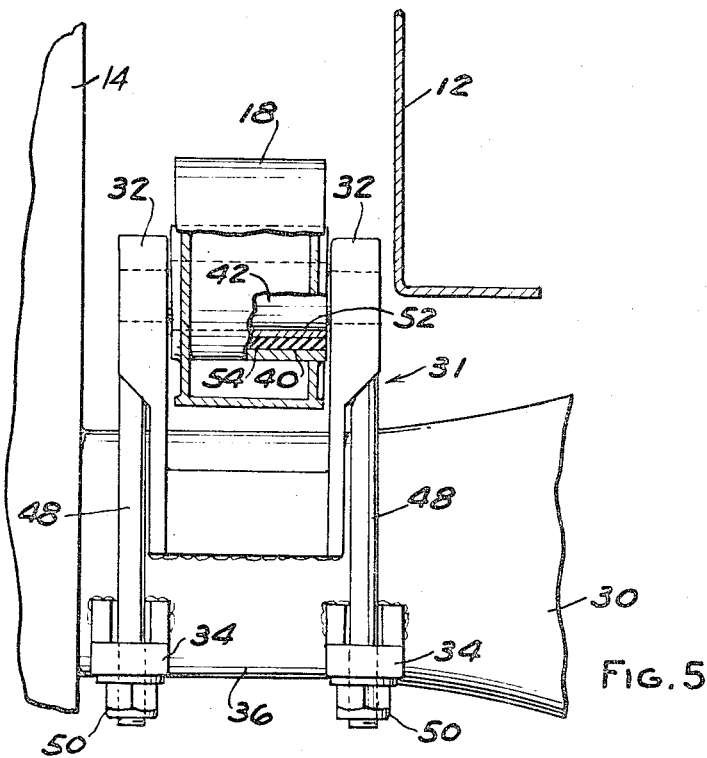
FIG. 5 is an enlarged generally sectional view on line 5—5 of FIG. 1.
Figure 6:
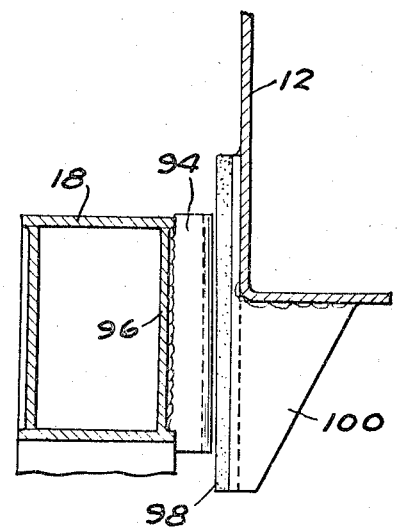
FIG. 6 is an enlarged generally sectional view on line 6—6 of FIG. 1.
Figure 8:
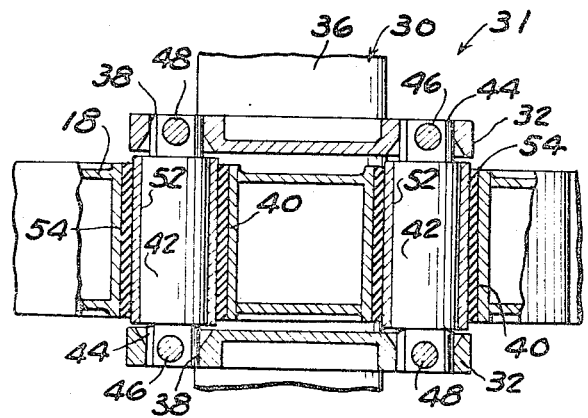
FIG. 8 is an enlarged sectional view on line 8—8 of FIG. 1.
Figure 7:
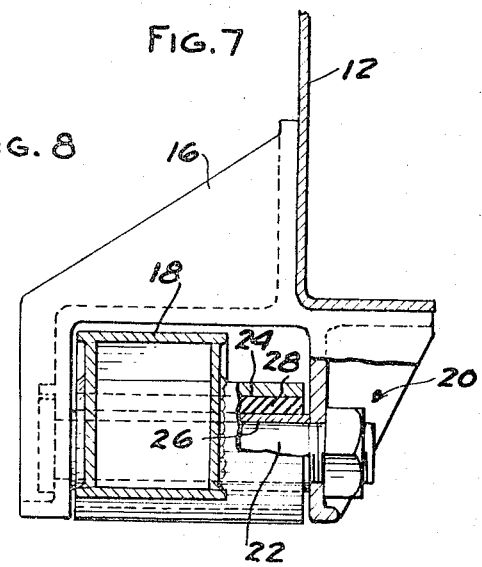
FIG. 7 is an enlarged generally sectional view on line 7—7 of FIG. 1.
Figure 9:
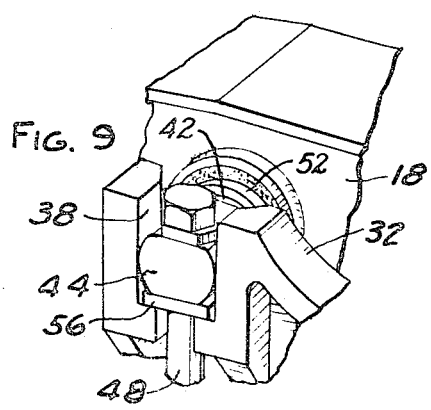
FIG. 9 is a fragmentary perspective view of a control arm-axle attachment.

Shown in the drawing is a vehicle 10 having a frame 12 from which ground-engaging wheels 14 are suspended by a suspension embodying the present invention. A bracket 16 is anchored to each side of frame 12 and each bracket projects laterally outwardly of the side of the frame into alignment with the horizontal space between the frame and a wheel 14. A control arm 18 is secured to each bracket 16 by means of a pivot 20 so that the control arm can swing vertically adjacent the outer side of frame 12. Pivot 20 comprises a bolt 22 which passes through openings in bracket 16 and an opening 24 in an end portion of the control arm (FIG. 7). A sleeve 26 surrounds bolt 22 and a torsion elastomer bushing 28 is disposed between the sleeve and opening 24.

Each wheel 14 is mounted on an axle or axle housing 30 by an attachment or connection 31. Attachment 31 includes a bracket illustrated as comprising upper and lower members 32, 34 anchored as by welding to a portion 36 of axle 30 which projects outwardly of the side of frame 12. Axle portion 36 typically has uniform cross dimensions and may have rectangular configuration as shown in the drawings or may be circular. In a geometric sense axle portion 36 is generally cylindrical. Control arms 18 are attached to brackets 32, 34.

Each bracket member 32 has a pair of longitudinally spaced sockets 38 and each control arm 18 has a pair of longitudinally spaced openings 40. Control arm 18 is nested between upper bracket members 32 with openings 40 therein aligned with sockets 38. A pin 42 is disposed in each opening 40 and has opposite end portions 44 disposed in the aligned sockets 38. Each end portion 44 has an opening 46 through which a bolt 48 passes. The lower end portions of the bolts pass through openings in lower bracket members 34 and nuts 50 thereon anchor the bolts, their respective pin ends 44 and control arm 18 to axle 30.

A sleeve 52 surrounds pin 42 and an elastomer bushing 54 is disposed between sleeve 52 and opening 40 in the control arm. Shims 56 may be inserted between pin ends 44 and the heads of bolts 48 or the bottoms of sockets 38 or both for a purpose to be described.

A beam 60 is connected to and extends between each pair of control arms 18. Beam 60 has adjacent each end a platform 62 which supports the lower end portion 64 of an air spring 66. The upper end portion 68 of the air spring is mounted in supporting relation to frame 12. Rebound of springs 66 is controlled by shock absorbers 70 connected to frame 12 and to a lateral extension 72 of each control arm 18 as shown. Beam 60 is connected to control arms 18 by means of pivotal connections 74. One member of each pivotal connection comprises a pin 76 provided at an end portion of control arm 18. The other member of the pivotal connection comprises a collar 78 at each end of beam 60, this collar surrounding pin 76. A sleeve 80 and a torsion elastomer bushing 82 are disposed between pin 76 and collar 78. Collar 78, sleeve 80 and bushing 82 are contained between a flange 84 on the control arm and a washer 86 thereon by means of a nut 88 on a threaded extension 90 of pin 76. The axes of pivots 74 coincide substantially with the longitudinal centerlines of control arms 18.

Air springs 66 have a substantial diameter so that they can utilize relatively low pressures. In order to avoid interference with wheels 14, the centerlines 92 of the air springs typically must be disposed laterally inwardly of the longitudinal centerlines of the control arms. As shown, these centerlines are disposed beneath portions of frame 12. Beam 60 causes load on load centers 92 of the springs to be transferred outwardly through pivots 74 to the longitudinal centerlines of the control arms. By this means maximum advantage is taken of the strength of axle housings 30. As shown, portions of springs 66 and their supporting platforms 62 are disposed vertically over portions of pivots 74.

A shoe 94 is secured as by welding to an inner side portion 96 of each control arm 18. A wear member 98 is secured by riveting or other suitable means (not shown) to a support 100 mounted on frame 12. The wear member is positioned for engagement with shoe 94 and may be made of a suitable wear-resistant material similar to brake lining.

In use were it not for the presence of beam 60 control arms 18 would be twisted about their longitudinal axes by the weight of the vehicle thereon. This is because the control arms must be relatively narrow to fit between frame 12 and wheels 14 and because load centers 92 of springs 66 are offset inwardly of the longitudinal center planes of the control arms. Control arms 18 would of themselves have insufficient strength to support the cantilevered load of the springs thereon without twisting. However, beam 60 is effective to transmit the spring load outwardly through joints 74 to the longitudinal center planes of the control arms.

When vehicle 10 is moving straight ahead and wheels 14 at opposite sides of the vehicle roll over similar surfaces, there is no significant differential movement between the pair of control arms 18. Let it now be assumed that the vehicle is encountering road conditions which cause differential vertical swinging movement of the control arms. This occurs when the vehicle rounds a curve so that it tends to lean to one side. It also occurs when one wheel 14 traverses a bump or depression while the other wheel passes over an unlike surface. Such differential vertical swinging movement of the control arms stresses beam 60 in torsion and the beam in cooperation with pivotal connections 74 strongly resists such differential swinging. The resistance of pivotal connections 74 is due to the fact that their axes are elongate in the direction of the longitudinal center planes of the control arms. However, elastomer sleeves 82 in joints 74 yield slightly to permit a limited amount of articulation of these joints.

Differential swinging movement of control arms 18 also tends to stress axle or axle housing 30 in torsion and the axle also resists such differential swinging. Elastomer sleeves 52 in axle attachments 31 strongly resist forces tending to stress axle 30 in torsion but yield slightly thereto to facilitate a limited amount of articulation of attachments 31. Unlike vertical swinging of the control arms also tends to increase the distance between joints 74 and the distance between attachments 31. Elastomer bushings 52, 82 yield somewhat in a direction transverse of the vehicle to accommodate this tendency.

The rigidity or flexibility of articulating connections 31, 74 in response to forces thereon acting in various directions can be varied by varying the configuration and dimensions of bushings 52, 82 and by varying the distribution of the elastomeric materials. Examples of such variations are disclosed in U.S. Pat. No. 3,332,701 discussed above. In general, if a greater degree of flexibility is required in a particular direction, a thicker body of elastomeric material is provided; and if greater rigidity is required, the elastomeric material is made thinner.

The flexibility or conversely the rigidity of the suspension to differential swinging movement of control arms 18 can also be varied by varying the longitudinal spacing between pins 42 and by varying the length of pins 76 and collars 78 forming members of pivotal connections 74.

When the vehicle rounds a corner forces are exerted on the suspension which tend to swing the control arms in a horizontal direction laterally of the vehicle frame. This tends to distort control arms 18 out of their normal rectangular relation to axle housing 30 and beam 60. However, elongate pivotal connections 74 strongly resist this tendency. Beam 60 thus provides a brace which supports the control arms against this horizontal lateral movement relative to the frame. Elastomer bushings 82, however, yield slightly to permit a limited amount of such movement. Beam 60 may be stressed either in tension or compression at this time depending upon the specific conditions encountered. Similarily, axle attachments 31 also resist the tendency of the control arms to depart from rectangular relation to axle 30. Elastomer bushings 52 yield slightly to permit a limited amount of such movement.

The extent of articulation of pivotal joints 74 and attachments 31 responsive to such lateral forces on the suspension can be varied by changing the dimensions of the members of pivotal joints 74, by changing the spacing between pins 42 and by varying the dimensions, configuration and distribution of the elastomer material forming bushing 52 and 82. In short, the flexibility or rigidity of the suspension to forces acting in various directions on the suspension can be tailored to meet the requirements of a specific vehicle simply by modifying axle attachments 31 and pivotal joints 74 in the manner discussed above. It is, therefore, not necessary to design a new suspension for each new type or different type of vehicle.

The slight articulation of attachments 31 and joints 74 facilitated by bushings 52, 82 greatly diminishes fatigue, wear and breakage of the metal components of the suspension and commensurately increases the life of the suspension.

Under many conditions of highway travel the forces discussed above will all be acting on the suspension at the same time to a greater or lesser extent. Beam 60 and its pivotal connections 74 in cooperation with the control arm-axle attachments provide adequate stability for the suspension under any combination of such forces which the vehicle is designed to encounter.

In a typical highway vehicle having a suspension according to this invention, beam 60, articulating joints 74 and articulating connections 31 are so arranged that differential vertical swinging movement of control arms 18 is limited to a maximum of about 3 inches when the vehicle is empty and about 6 inches when the vehicle is loaded. Maximum horizontal movements of the control arms relative to the frame is a fraction of an inch. If unusual lateral forces should act on the control arms, one or the other of shoes 94 will engage its respective wear member 98 and support the control arms against undue lateral swinging. If the vehicle is to traverse uneven ground off of the highway, the various components would be constructed and arranged to permit greater maximum movements of the control arms, particularly differential vertical movements.

The use of shims 56 above or below pin ends 44 facilitates a fine adjustment of the vertical position of control arms 18 relative to axle or axle housing 30. In addition, the angular position of axle 30 about its own axis with respect to control arms 18 may be adjusted by placing shims 56 in different numbers or thicknesses above or below the right-hand and left-hand pin ends as the drawings are viewed. By this means the pinion angle of a driven axle may be adjusted.

The form of the invention shown diagrammatically in FIG. 3 is in general similar to that described above except that beam 60a is rigidly connected to the control arms as by welding. Beam 60a is provided with an articulating joint 74a comprised of beam portions 102, 104 disposed in telescoped relation and having a body of elastomer material 106 disposed therebetween. With this arrangement joint 74a can articulate as necessary when beam 60 is in torsion, is under compression r tension, or is under forces tending to deflect it. Thus, the eam and its articulated joint yieldably supports the control rms against the various forces thereon discussed above.

FIG. 4 illustrates a modified form of the invention similar to 1at of FIG. 3 except that beam 60b has spaced-apart flanges 08 secured to an interposed body of elastomer material 110 1ereby providing an articulating joint 74b. With this arrange1ent also the beam and its joint can yieldably support the conol arms against the various forces thereon discussed above.

As in the form of the invention first described above, the restance offered by beams 60a and 60b to unlike movements of 1e control arms to which they are connected can be varied by 1anging the characteristics of the beam itself and of the com1nents forming articulating joints 74a and 74b.

I claim:

1. In a vehicle having a frame with ground-engaging wheels 1spended therefrom through an axle having connections with 1ch of a pair of vertically swingable, longitudinally extending 1ntrol arms, each connection including a plurality of longitu1nally spaced, laterally extending pins and an associated 1siliently distortable material configured and dimensioned to 1cilitate limited predetermined articulation of the connec1ons responsive to torsional and lateral forces thereon, and 1ring means operably interposed between said control arms nd frame, improved structure which comprises:

each control arm being mounted so that it swings vertically within the horizontal space between an outer side of the vehicle frame and the inner side of a ground-engaging wheel adjacent thereto;

beam means extending transversely of said control arms and being connected therewith;

said beam means being disposed in load transmitting relation between said spring means and control arms;

said beam means providing torsion means operative to resist differential vertical swinging movements of said control arms and also providing brace means operative to resist horizontal movements of said control arms relative to the vehicle frame;

joint means which incorporates means on said beam means and which articulates responsive to said movements of said control arms;

said joint means including a material resiliently distortable responsive to articulation thereof; and the latter said material being configured and dimensioned to provide a generally predetermined resistance to each of said movements of said control arms, and wherein said pins are disposed at opposite sides of the axial center line of said axle, said pins having end portions, each of said connections including bolt means extending transversely of said pins and securing said end portions to said axle.

2. The structure defined in claim 1 wherein said connec1ons are with portions of said axle disposed substantially en1rely outwardly of the sides of said frame.

3. The structure defined in claim 2 wherein said axle is a riven axle.

4. The structure defined in claim 1 and including in addition djusting means operable to adjust the height of said end porons, whereby to adjust the relative positions of said axle and ontrol arms, said adjusting means including shim means electively disposable above and below said end portions.

5. The structure defined in claim 4 wherein said end porons have openings through which said bolt means extend, aid shim means being disposable selectively above and below aid opening around said bolts for so adjusting said relative ositions.

6. In a vehicle having a frame with ground-engaging wheels uspended therefrom through an axle having connections with ach of a pair of vertically swingable, longitudinally extending ontrol arms, each connection including a plurality of longitu1nally spaced, laterally extending pins and an associated 1siliently distortable material configured and dimensioned to 1cilitate limited predetermined articulation of the connec1ons responsive to torsional and lateral forces thereon, and spring means operably interposed between said control arms and frame, improved structure which comprises:

beam means extending transversely of said control arms and being connected therewith;

said beam means being disposed in load transmitting relation between said spring means and control arms;

said beam means providing torsion means operative to resist differential vertical swinging movements of said control arms and also providing brace means operative to resist horizontal movements of said control arms relative to the vehicle frame;

joint means which incorporates means on said beam means and which articulates responsive to said movements of said control arms;

said joint means including a material resiliently distortable responsive to articulation thereof;

the latter said material being configured and dimensioned to provide a generally predetermined resistance to each of said movements of said control arms;

said pins being disposed at opposite sides of the axial centerline of said axle, said pins having end portions;

each of said connections including a bracket on said axle and bolt means which anchor said end portions to said bracket;

and adjusting means operable to adjust the height of said end portions whereby to adjust the relative positions of said axle and control arms; and said adjusting means including shim means selectively disposable above and below said end portions.

7. In a vehicle having a frame with ground-engaging wheels suspended therefrom through an axle having connections with each of a pair of vertically swingable, longitudinally extending control arms, each connection including a plurality of longitudinally spaced, laterally extending pins and an associated resiliently distortable material configured and dimensioned to facilitate limited predetermined articulation of the connections responsive to torsional and lateral forces thereon, and spring means operably interposed between said control arms and frame, improved structure which comprises;

beam means extending transversely of said control arms and being connected therewith;

said beam means being disposed in load transmitting relation between said spring means and control arms;

said beam means providing torsion means operative to resist differential vertical swinging movements of said control arms and also providing brace means operative to resist horizontal movements of said control arms relative to the vehicle frame;

joint means which incorporates means on said beam means and which articulates responsive to said movements of said control arms;

said joint means including a material resiliently distortable responsive to articulation thereof;

the latter said material being configured and dimensioned to provide a generally predetermined resistance to each of said movements of said control arms;

said pins being disposed at opposite sides of the axial centerline of said axle;

said pins having end portions and each of said end portions having an opening;

each of said connections including a bracket on said axle and an anchor bolt which passes through each opening and secures said end portions to said bracket, and adjusting means operable to adjust the height of said end portions whereby to adjust the relative positions of said axle and control arms.

8. The structure defined in claim 7, said adjusting means comprising a plurality of shims disposable selectively above and below said opening around said bolts for adjusting the relative positions of said control arms and axle.

9. In a vehicle having a frame with ground-engaging wheels suspended therefrom through an axle having connections with each of a pair of vertically swingable, longitudinally extending control arms, each connection including a plurality of longitudinally spaced, laterally extending pins and an associated resiliently distortable material configured and dimensioned to facilitate limited predetermined articulation of the connections responsive to torsional and lateral forces thereon, and spring means operably interposed between said control arms and frame, improved structure which comprises:

beam means extending transversely of said control arms and being connected therewith;

said beam means being disposed in load transmitting relation between said spring means and control arms;

said beam means providing torsion means operative to resist differential vertical swinging movements of said control arms and also providing brace means operative to resist horizontal movements of said control arms relative to the vehicle frame;

joint means which incorporates means on said beam means and which articulates responsive to said movements of said control arms;

said joint means including a material resiliently distortable responsive to articulation thereof;

the latter said material being configured and dimensioned to provide a generally predetermined resistance to each of said movements of said control arms;

said pins being disposed at opposite sides of the axial centerline of said axle and having end portions; and each of said connections including bolt means extending transversely of said pins and securing said end portions to said axle.